April 20, 1948.   F. D. BRADDON   2,439,793
PRESSURE REGULATOR FOR INSTRUMENT HOUSINGS
Filed Feb. 22, 1944

INVENTOR
F. D. BRADDON
BY
Herbert H. Thompson
ATTORNEY.

Patented Apr. 20, 1948

2,439,793

UNITED STATES PATENT OFFICE 2,439,793

PRESSURE REGULATOR FOR INSTRUMENT HOUSINGS

Frederick D. Braddon, Babylon, N. Y., assignor to The Sperry Corporation, a corporation of Delaware Application February 22, 1944, Serial No. 523,493

3 Claims. (Cl. 98—1.5)

1

This invention relates to a substantially closed fluid recirculating system in which the fluid is maintained free of dust, dirt, moisture and oil to improve the performance of the instrument with which it is employed.

For purposes of illustration, the instrument housing of a gyroscopic autopilot for aircraft is shown as a part of the system. With such usage of the system, the fluid may be utilized in a conventional manner to provide the driving and erecting means for the gyroscopic parts of the instrument or may merely be used to prevent the windows of the autopilot from fogging. Inasmuch as the present invention relates to a fluid recirculating system, per se, the supply and exhaust parts thereof are shown leading to and from the illustrated type of instrument housing and no specific showing is made of the manner in which the fluid is utilized.

One of the objects of the invention is to provide a system of this character in which the fluid conditions in the respective parts of the system remain substantially constant under different external pressure and temperature conditions.

In systems of this character, due to the construction of the instrument housing there is some leakage of fluid therefrom despite efforts to prevent the same. This is necessitated because of manually operable controls that extend exteriorly of the housing and the difficulty in making the shafts on which the controls are located leak proof as far as the fluid in the system is concerned. One of the features of the invention is concerned with the provision of a system in which additional fluid is introduced therein to make up for the loss due to leakage.

A further feature of the invention resides in the controls provided for regulating the temperature of the fluid in the system.

Figure 1:
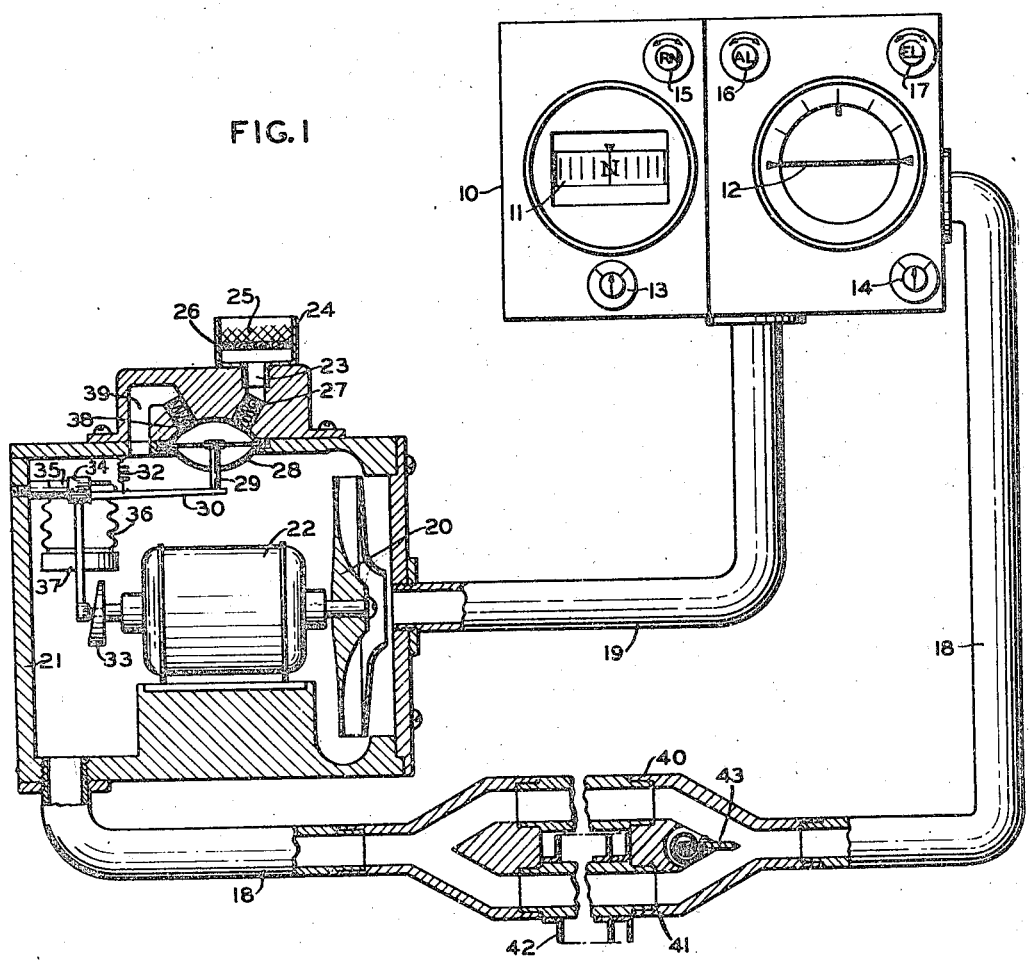
Figure 2:
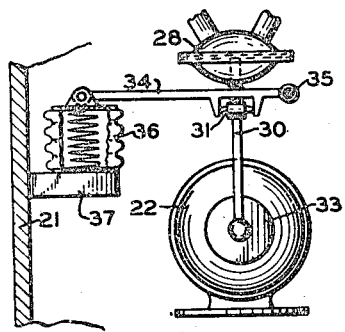
Figure 3:
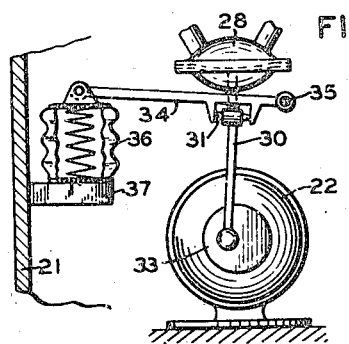

Other objects, features and details of the invention will be apparent from the following description when read in relation to the accompanying drawing, wherein Fig. 1 is a schematic view of a system constructed in accordance with the present invention with some of the parts thereof being shown in section;

Fig. 2 is a detail end elevation of the mechanism of the system that is effective to operate the fluid make-up pump; and Fig. 3 is a view similar to Fig. 2 showing the mechanism in an effective position.

With reference to the drawing, the instrument housing part of the system is generally indicated at 10. In the present showing, the housing 10 completely encloses an automatic pilot instrument of the gyroscopic type. The indicating card of the directional gyro of the instrument is designated at 11. The horizon bar of the artificial horizon of the instrument is indicated at 12. The caging knobs for the directional gyro and the artificial horizon of the automatic pilot are respectively indicated at 13 and 14. These knobs are manually operable by the pilot of the dirigible craft on which the instrument is employed, the knobs being on shafts that extend exteriorly of the housing for the instrument. Leakage of fluid in the system from the instrument housing 10 can occur along the shafts of the caging knobs as the same must be free to be rotated under control of the pilot. A further source of fluid leakage from the system is noted in the present instance by the rudder control knob 15, aileron control knob 16 and elevator control knob 17 of the automatic pilot instrument all of which extend exteriorly of the housing 10 and are settable by the pilot to alter the attitude of the craft on which autopilot is employed.

As shown in Fig. 1, a conduit, pipe or line 18 is included in the system to supply fluid such as air to the instrument housing, one end of the conduit being suitably connected to the housing. After utilization of the fluid in a desired manner within the housing, the fluid is exhausted therefrom by way of a second conduit, pipe or line 19 which also is connected to the instrument housing. To provide circulation of fluid in the system, means in the form of a centrifugal blower or rotary pump 20 may be interposed between the supply and exhaust conduits or pipes. As shown, the blower is located in a casing 21 to which the conduits are connected at different places. In the present showing, the blower unit or casing 21 is a separate entity that is situated at a distance from the instrument housing. This unit may however, be incorporated in or mounted on the instrument housing in order to materially shorten the length of the conduits 18 and 19 and thus improve the design of the system. The blower is preferably driven by a suitable constant speed motor 22 which in this instance is fixedly mounted on the base of the casing 21. Motor 22 may be located within the casing to provide a means for heating the fluid or air circulating or passing over the same when moving from pipe 19 to pipe 18. The motor 22 is energized from a suitable source of electrical energy (not shown). The blower 20 provides a flow means or pump that operates to maintain a pressure differential in the respective conduits 18 and 19 and thus continuously circulates fluid through the instrument housing 10. In an illustrative system of this character, the fluid employed may be air and the pump may be designed to maintain a pressure differential between pipes 18 and 19 of approximately two pounds per square inch. This pressure differential may be employed in the instrument housing to pneumatically spin the gyro rotors of the respective instruments of the autopilot in a manner well known in the art. Other possible functions of the system were hereinbefore noted.

To provide a means for replenishing the fluid or air lost in the system due to leakage, an opening or port 23 is employed to admit fluid to the system. This port receives fluid from a container 24 which is open in the present instance as the fluid employed is air and the source thereof is the atmosphere. The container shown includes a filter 25 that removes dust and dirt particles from the air that is drawn into the system. Moisture is removed from the entering air by suitable means such as a silica gel filter 26 in the container 24. Fluid entering the system by way of port 23 is received in the supply end of the system so the port may be considered to be in the supply conduit 18. Valve 27 provides means for normally closing the port 23 to prevent the entrance of air from the atmosphere into the substantially closed system.

The air make-up means further includes a normally ineffective diaphragm type pump that is located in the cover of the casing 21. The diaphragm 28 has a reciprocating plunger 29 that oscillates under control of a bell crank 30 in the construction shown. The pivot point for the bell crank 30 is indicated at 31, Fig. 2. A spring 32 between the casing 21 and crank 30 supports the crank so that one end of the same is urged against the tip of the plunger 29 and the other end of the same is continuously in engagement with an eccentric 33 that is fixed to the shaft of the motor 22. A roller bearing is preferably employed in the end of the bell crank that engages the eccentric. As particularly shown in Figs. 2 and 3, the bell crank 30 is pivotally mounted on a movable arm 34 one end of which is pivotally secured to the casing as indicated at 35. The opposite end of the arm 34 is positioned by a pressure-responsive device such as the bellows 36 one end of which is fixed to a platform 37 suitably fixed to the casing 21. The pressure-responsive bellows is situated in this instance in the supply end of the system within the casing 21. With a normal pressure in the supply conduit 18, the bellows 36 and arm 34 controlled thereby position the bell crank 30 as shown in Fig. 2. In this position the end of the bell crank engaging the eccentric is at the center thereof and the rotating eccentric is not effective to transmit motion. When the pressure in line or pipe 18 falls below its predetermined value, the bellows unit 36 expands under influence of its spring and the arm 34 is moved clockwise as viewed in Fig. 2 about its pivot 35. This position of the mechanism is shown in Fig. 3, the eccentric engaging end of the bell crank being moved off the center of the eccentric. The crank 30 then rocks about its pivot axis 31 and the diaphragm 28 is oscillated by the plunger 29. On the down strokes of the diaphragm, the valve 27 is opened and dry air is drawn through the port 23 from the atmosphere. When sufficient pressure is built up by the diaphragm pump, the air enters the system through a second valve 38 by way of passageway 39 in the cover of the casing. When sufficient pressure is restored to the supply line due to the make-up air, the diaphragm pump is rendered ineffective. The diaphragm pump provides a means for replenishing the air lost in the system due to leakage. This means is normally ineffective and is rendered effective by the pressure responsive means employed in the system. Obviously a separate motor may be employed to drive the make-up pump if desired. It will be understood that fluid loss occurs in the system when the fluid pressure within the housing is greater than the pressure outside of the housing. One instance where such a condition can occur is during high altitude flight of an aircraft in which the system is employed.

Means are also provided in the improved system for maintaining the temperature of the fluid or air supplied to the casing 10 substantially constant. As shown in the drawing, the supply conduit 18 has a portion with two branches therein as indicated at 40 and 41. Branch 41 is provided with a number of fins 42 that provide a cooling means for the fluid flowing in the branch. The fluid normally flows equally in both branches of the conduit 18 and the effectiveness of the cooling means provided is varied by a thermally responsive hinged gate 43 which functions to regulate the fluid flow in the respective branches in the desired manner. As previously noted, the heating means for the fluid in the system is provided by the motor 22 in the present instance.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a substantially closed air recirculating system, the combination of, an instrument housing in which air is utilized, a conduit through which air is supplied to the housing, a conduit through which air is exhausted from the housing, means interposed between the supply and exhaust conduits for continuously circulating the air in the system, a port to the atmosphere in one of the conduits, a valve normally closing said port, normally ineffective pumping means operable to open the valve and draw air into the system by way of the port to replenish the air lost in the system due to unintentional leakage, and pressure responsive means for rendering said pumping means effective when the pressure in one of the conduits drops below a predetermined value.

2. In a substantially closed air recirculating system, the combination of, an instrument housing in which air is utilized, a conduit through which air is supplied to the housing, a conduit through which air is exhausted from the housng, means interposed between the supply and exhaust conduits for continuously circulating the air in the system, a port to the atmosphere in said supply conduit, a valve normally closing said port, normally ineffective pumping means operable to open the valve and draw air into the system by way of the port to replenish the air lost in the system due to unintentional leakage, and pressure responsive means for rendering said pumping means effective when the pressure in one of the conduits drops below a predetermined value.

3. In a substantially closed air recirculating system, the combination of, an instrument housing in which air is utilized, a conduit through which air is supplied to the housing, a conduit through which air is exhausted from the housing, means interposed between the supply and exhaust conduits for continuously circulating the air in the system, a port to the atmosphere in said supply conduit, a valve normally closing said port, normally ineffective pumping means operable to open the valve and draw air into the system by way of the port to replenish the air lost in the system due to unintentional leakage, and pressure responsive means for rendering said pumping means effective when the pressure in the supply conduit falls below a predetermined value.

FREDERICK D. BRADDON.

REFERENCES CITED

The following references are of record in the file of this patent:

UNITED STATES PATENTS

| Number | Name | Date |
|---|---|---|
| 2,012,115 | Woodruff | Aug. 20, 1935 |
| 843,909 | Peters et al. | Feb. 12, 1907 |
| 2,190,168 | Armistead | Feb. 13, 1940 |
| 1,986,863 | Terry | Jan. 8, 1935 |
| 2,184,473 | Scanlon | Dec. 26, 1939 |
| 952,775 | Whitlatch | Mar. 22, 1910 |
| 2,223,415 | Groves | Dec. 3, 1940 |
| 1,631,052 | Oertel | May 31, 1927 |
| 942,150 | Tiemann | Dec. 7, 1909 |
| 1,450,377 | Lunt | Apr. 3, 1923 |
| 1,866,346 | Clark | July 5, 1932 |
| 2,265,461 | Wagner | Dec. 9, 1941 |
| 1,696,612 | Rice | Dec. 25, 1928 |
| 1,559,182 | Rice | Oct. 27, 1925 |
| 1,546,234 | Hannah | July 14, 1925 |
| 1,722,632 | Johnson | July 30, 1929 |